Nov. 4, 1958

C. W. KING 2,859,356

TRANSISTOR CONTROL CIRCUIT FOR PARALLEL GENERATORS

Filed May 23, 1956

INVENTOR.
CHARLES W. KING
BY
John P. Marvin
ATTORNEY

INVENTOR.
CHARLES W. KING
BY John T. Marren
ATTORNEY

Nov. 4, 1958

C. W. KING 2,859,356

TRANSISTOR CONTROL CIRCUIT FOR PARALLEL GENERATORS

Filed May 23, 1956

INVENTOR.
CHARLES W. KING
BY
ATTORNEY

United States Patent Office 2,859,356
Patented Nov. 4, 1958

2,859,356

TRANSISTOR CONTROL CIRCUIT FOR PARALLEL GENERATORS

Charles W. King, Anderson, Ind., assignor to General Motors Corporation, Detroit, Mich., a corporation of Delaware Application May 23, 1956, Serial No. 586,742

15 Claims. (Cl. 307—57)

This invention relates to alternator voltage regulation and more particularly to a method and circuit network to individually control the output voltages of two alternators that are connected in parallel through rectifiers to a common direct current circuit.

It is an object of the present invention to individually control the fields of two variable speed alternators that are connected in parallel so the output of the alternators will be substantially equal.

Another object of the present invention is to individually control the field currents of two alternators with separate voltage regulators and to interconnect the regulators so the output of the alternators will be substantially equal when the alternators have their output terminals connected in parallel to a common direct current circuit.

A further object of the present invention is to individually control the fields of two alternators with individual transistorized voltage regulators and to interconnect said regulators so the output of the two alternators will be substantially equal when the alternators are connected in parallel to supply a common direct current circuit.

In carrying out the above objects it is a further object to vary the control of a voltage regulator on the field of an alternator by a means that includes at least one transistor that is made conductive whenever the output of the alternator is different from the output of another alternator that is connected in parallel with the first alternator to supply a common direct current circuit.

A still further object of the present invention is to maintain the outputs of at least two alternators equal when the alternators are connected in parallel to substantially supply a common direct current circuit with power. This object is accomplished by individually controlling the fields of the alternator with individual voltage regulators that include a voltage divider, a voltage sensitive diode, and transistors, and to interconnect the voltage regulators through transistors which are connected to the common direct current circuit.

Another object of the present invention is to control the opening and closing of a relay for paralleling the field control circuits of two alternators by a circuit that includes one of the transistors in the voltage regulator circuit.

Further objects and advantages of the present invention will be apparent from the following description, reference being had to the accompanying drawings, wherein preferred embodiments of the present invention are clearly shown.

Figure 1:
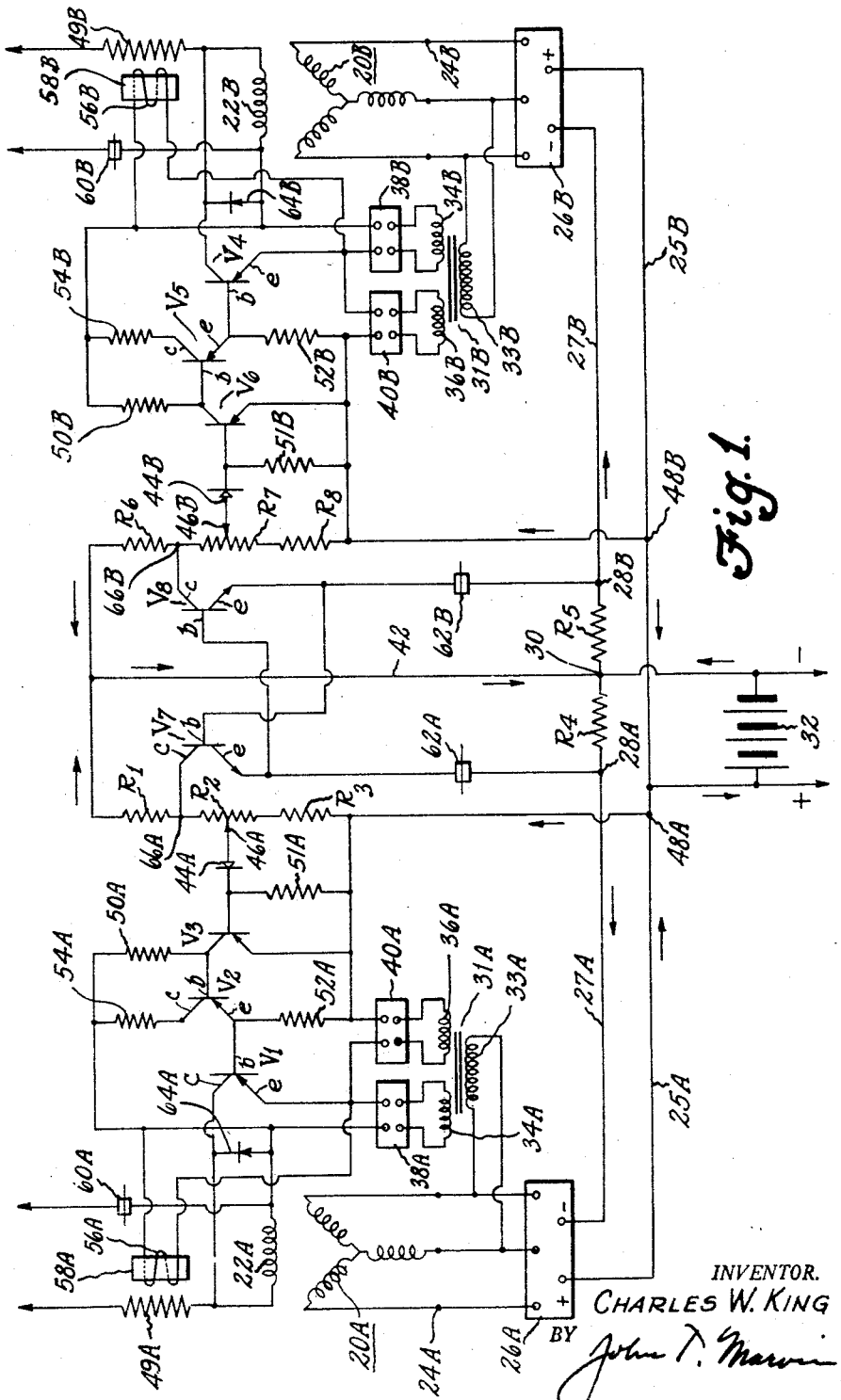
Figure 1 shows a circuit for paralleling two transistor voltage regulators which control the energization of the fields of a pair of alternators.

In the drawings a pair of alternators 20A and 20B are shown. These alternators are each connected to circuits which are duplicates of each other and therefore, whenever possible the circuit for only one of the alternators will be described to avoid needless duplication of the specification. The circuit described for the alternator 20 will apply to the circuits for the both alternators 20A and 20B as will be hereinafter apparent.

The alternator 20 has its output terminals 24 connected to the input terminals of a rectifier 26. The positive output terminals of the rectifiers 26A and 26B are connected to leads 25A and 25B respectively, which are connected together and to the positive terminal of a battery 32, which may also be connected with a D. C. load. The negative terminal of the rectifier 26A is connected through a lead 27A, a junction 28A, and a resistance $R_4$ to a junction 30. The negative output terminal of the rectifier 26B is connected through a lead 27B to a junction 28B. The junction 28B is connected through a resistance $R_5$ with junction 30. Junction 30 is connected to the negative terminal of the battery 32. Connected across the output terminals of rectifier 26A is a voltage divider which consists of resistances $R_1$, $R_2$ and $R_3$. Connected across the output leads of rectifier 26B is a voltage divider which consists of resistances $R_6$, $R_7$ and $R_8$. The voltage divider resistances are connected from junctions 48A and 48B, respectively through a common lead 42 to junction 30.

While the alternators 20 are shown as having Y-connected windings, it is apparent that the alternators may be of the single or multiple phase types, and if desired, may be of the delta wound types. These alternators are well known and each have an exciting field winding 22, the energization of which will be controlled by a voltage regulator as will be hereinafter described.

A transformer 31 has its primary coil winding 33 connected across two of the output leads of the alternator. This transformer has a pair of secondary coil windings 34 and 36, which are respectively connected to rectifiers 38 and 40.

A voltage sensitive diode 44 is connected to an adjustable tap 46 on each of the resistances $R_2$ and $R_7$. These diodes are of the Zener type. The function of a Zener type diode is set forth in application S. N. 586,787, concurrently filed herewith. This application has been assigned to the assignees of the present invention. The diodes 44 will each be conductive when the voltage drop between a junction 48 and the tap 46 exceeds a predetermined value. The transistors $V_1$, $V_2$, $V_3$, $V_4$, $V_5$ and $V_6$ are of the PNP type, that is, they will become conductive when the base $b$ is negative with respect to the emitter $e$ and when the emitter is positive with respect to the collector $c$. When the base of the transistor is negative with respect to the emitter, the current will flow between the emitter and the collector $c$. The amount of current flow between the emitter and collector will be proportional to the voltage difference between the emitter and base of the transistor. When the diode 44 becomes conductive, current will flow from junction 48, through the resistance 51, the diode 44 and tap 46. This will cause the base of transistor $V_3$ to be made negative relative to its emitter. Transistor $V_3$ will thus be made conductive and will cause current through resistance 50 to increase. When current increases in resistance 50, the base of transistor $V_2$ will become more positive relative to its emitter. Transistor $V_2$ will thus be made less conductive and the current flow through resistances 52 and 54 is decreased. The decrease in current flow through resistance 52 will cause the base of transistor $V_1$ to become more positive relative to the emitter of $V_1$ and correspondingly cause a decrease in current between the emitter and collector of transistor $V_1$. The emitter and collector of transistor $V_1$ is in series with the field 22 of the alternator 20, so, as the current flow through transistor $V_1$ is reduced, the energization of the field 22 is decreased. The decrease in energization of the alternator field of course will lower the output voltage of the alternator.

From the drawing it will be seen that suitably connected across field 22 are a pair of leads, one of which contains a pair of normally closed contacts 60. These leads are connected through a suitable on-off switch, not shown, and a resistance 49 with a suitable source of D. C. current, not shown, as a storage battery. This arrangement will permit the field 22 to be excited from an external D. C. current source until the alternator 20 is developing a sufficient output to render the system self-exciting. When the alternator output reaches a sufficient value, the coil 56 of relay 58 which is connected across the output terminals of rectifier 38 will cause the contacts 60 to open and break the circuit between the field 22 and external D. C. current and voltage source.

The paralleling relay contacts 62 are designed to close when alternator has reached a predetermined output. This is accomplished by connecting the paralleling relay coil, not shown, across the output terminals of rectifier 38. In this manner the paralleling circuit of an alternator is functional only when its alternator is operating. The rectifier 64 is a blocking rectifier used to provide a path for any induced voltage in the field to dissipate itself, thus protecting transistor $V_1$.

The paralleling circuit for the two alternators will now be described. In this connection it is to be noted that another type of paralleling circuit and a complete description of another circuit network for controlling the field of the alternators when they are in parallel, is set forth on the application mentioned supra. The transistors $V_7$ and $V_8$ as used in the paralleling circuit are of the NPN type. These transistors operate as follows: When the base $b$ of an NPN transistor is positive with respect to the emitter $e$, current will flow from the collector $c$ to the emitter $e$ providing the collector $c$ is positive with respect to the emitter $e$.

The transistor $V_7$ has its collector connected to junction 66A. This junction 66A is located between resistances $R_1$ and $R_2$. The collector of transistor $V_8$ is connected to junction 66B which is located between resistances $R_6$ and $R_7$. The junctions 66A and 66B are always more positive than the junctions 28A and 28B, respectively, which are connected to the emitters of transistors $V_7$ and $V_8$ respectively. Consequently, the conduction of each of the transistors $V_7$ and $V_8$ is a function of the polarity of their respective bases with respect to the emitters. The normally open contacts 62A and 62B are arranged to control the circuit between the emitters of transistors $V_7$ and $V_8$ and the junction 28. These contacts are part of the relays, not shown, and will close when the alternators are producing somewhere near their rated output. When contacts 62 close the circuits to the respective emitters of transistors $V_7$ and $V_8$ are complete so that the paralleling circuit will become operative.

The operation of the paralleling circuit is as follows: assume the alternator 20A is set to operate at a higher voltage than the alternator 20B. When this condition occurs, current flow in lines 25A and 27A will be greater than the current flow in lines 25B and 27B and will be in the direction indicated by the arrows, if we assume the current flow from positive to negative. When this occurs, the voltage drop across resistance $R_4$ will be greater than the voltage drop across resistance $R_5$ to make junction 28A more negative than junction 28B, or it can be stated that junction 28B is positive with respect to junction 28A. The junction 28B is connected to the base $b$ of transistor $V_7$ through the contacts 62B of the paralleling relay. Junction 28A is connected to th emitter $e$ of the transistor $V_7$ through contacts 62A, so the base of transistor $V_7$ will be positive relative to its emitter and transistor $V_7$ will conduct. When the transistor $V_7$ is conducting, the resistance $R_1$ will be partially shorted from the circuit which includes lead 42. This will cause the voltage drop across resistances $R_2$ and $R_3$ to be increased. When the voltage drop across $R_2$ and $R_3$ is increased, the voltage drop across diode 44 is correspondingly increased and the diode's conduction is increased, as heretofore set forth. This will decrease the energization of field 22A and the output of alternator 20 will be decreased until its output approaches the output of alternator 20B. When this occurs the voltage drop difference between resistances $R_4$ and $R_5$ will be reduced, and the conduction of transistor $V_7$ will be correspondingly reduced until a steady state or balanced condition is established.

While transistor $V_7$ is conducting, transistor $V_8$ will not be conductive because the base $b$ which is connected to junction 28A will be negative relative to its emitter, which is connected to junction 28B.

When the alternator 20B is set to operate at a higher voltage than alternator 20A, then transistor $V_8$ will be conductive in the same fashion as transistor $V_7$. In this instance the output of the alternator 20B will be reduced until a steady state or balanced condition is established.

It is to be noted the circuits described will maintain the outputs of the paralleled alternators substantially equal. When two alternators are connected as shown in the drawings, the output voltages at the rectifiers will be equal, but the output currents may differ considerably. The output of the alternator is a function of both the current and the voltage. The paralleling circuit network, including resistances $R_4$ and $R_5$, is responsive to the differences in output current of the alternators. The regulator circuits which include resistances $R_1$, $R_2$, $R_3$, $R_6$, $R_7$ and $R_8$ are essentially responsive to the voltage across leads 25 and 27. These regulators by taps 46 may be adjusted to maintain the voltages across these leads at any predetermined level. Thus as the entire circuit network is responsive to both voltage and current, the output of the alternators, will be maintained substantially constant and equal at a predetermined level.

It has been pointed out that a transistor becomes conductive when a voltage difference exists and the amount of conduction of a transistor is dependent on the amount of voltage difference. However, when the voltage impressed across a transistor is very small, the transistors will not conduct. Thus a predetermined output difference must exist in order that the paralleling circuits may function. This difference will vary and will depend upon the characters of the transistors used and we have found a difference of 0.1 volt or more will cause the paralleling circuit to operate. When more than this difference exists the output of the two alternators will be brought closer together until a steady state or balanced condition exists. However, the small difference in output will remain after the paralleling control transistors cease to be conductive.

Figure 2:
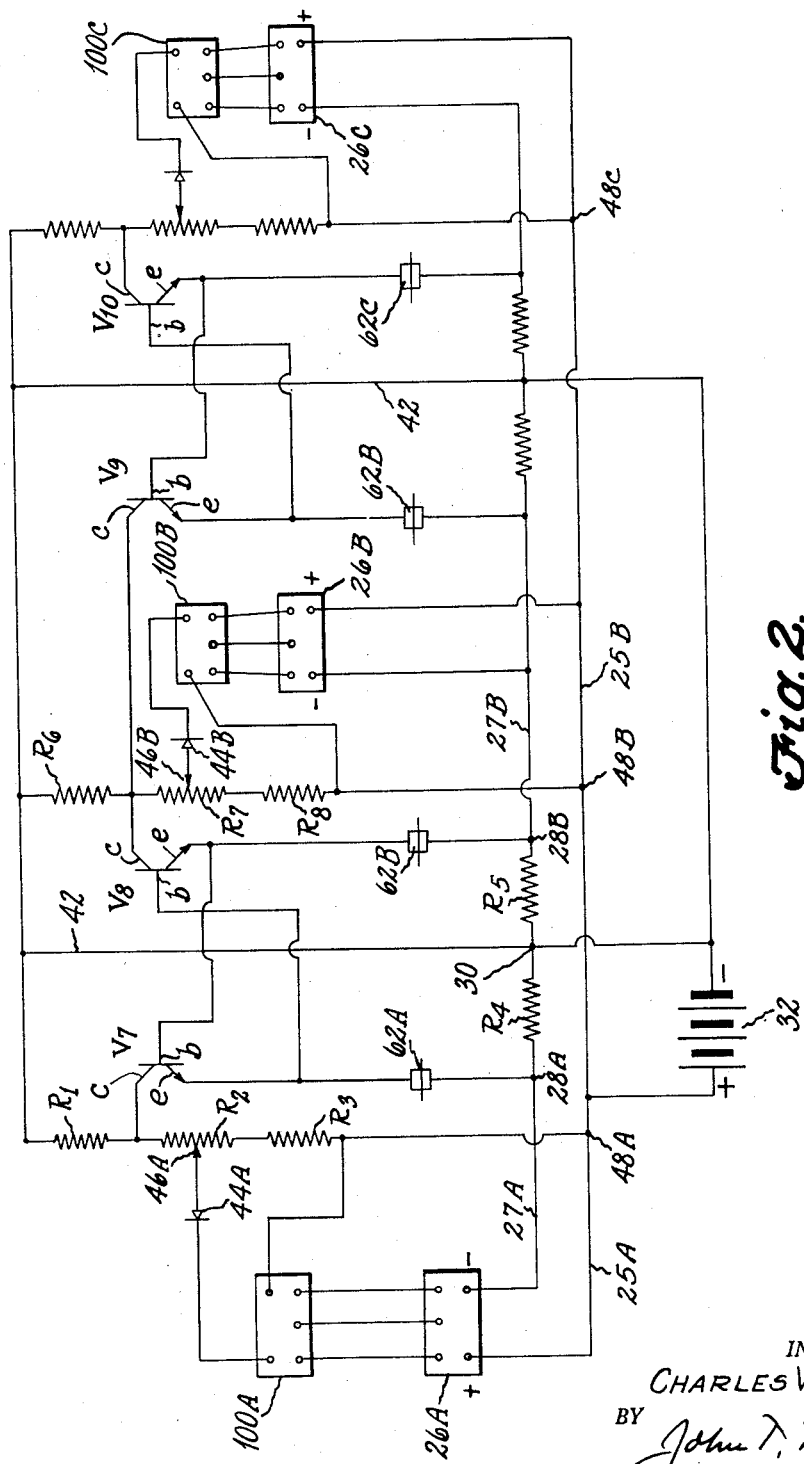
Figure 2 shows a circuit for paralleling three alternators according to the present invention.

In Figure 2 a method and circuit for paralleling three or more alternators is shown. In this figure the numeral 100A, 100B and 100C designates the alternator and voltage regulator circuit which have been previously described. The rectifiers 26A, 26B and 26C are connected through the leads to the battery 32 as have been previously indicated. The transistors $V_7$ and $V_8$ operate in the same fashion as described for the embodiment shown in Figure 1 to maintain the output of alternator 100A and 100B substantially equal. It is clearly apparent that the action of transistors $V_9$ and $V_{10}$ in controlling the alternators connected therewith will be similar to the action of the transistors $V_7$ and $V_8$, so that the output of alternator 100B will be substantially equal at all times to the output of the alternator 100C. Thus, all of the alternators 100A, 100B and 100C will be tied together so that the outputs of each will be substantially equal. It is manifest that if more than three alternators are to be placed in parallel, the circuity shown in Figure 2 may be extended to accomplish the result.

Figure 3:
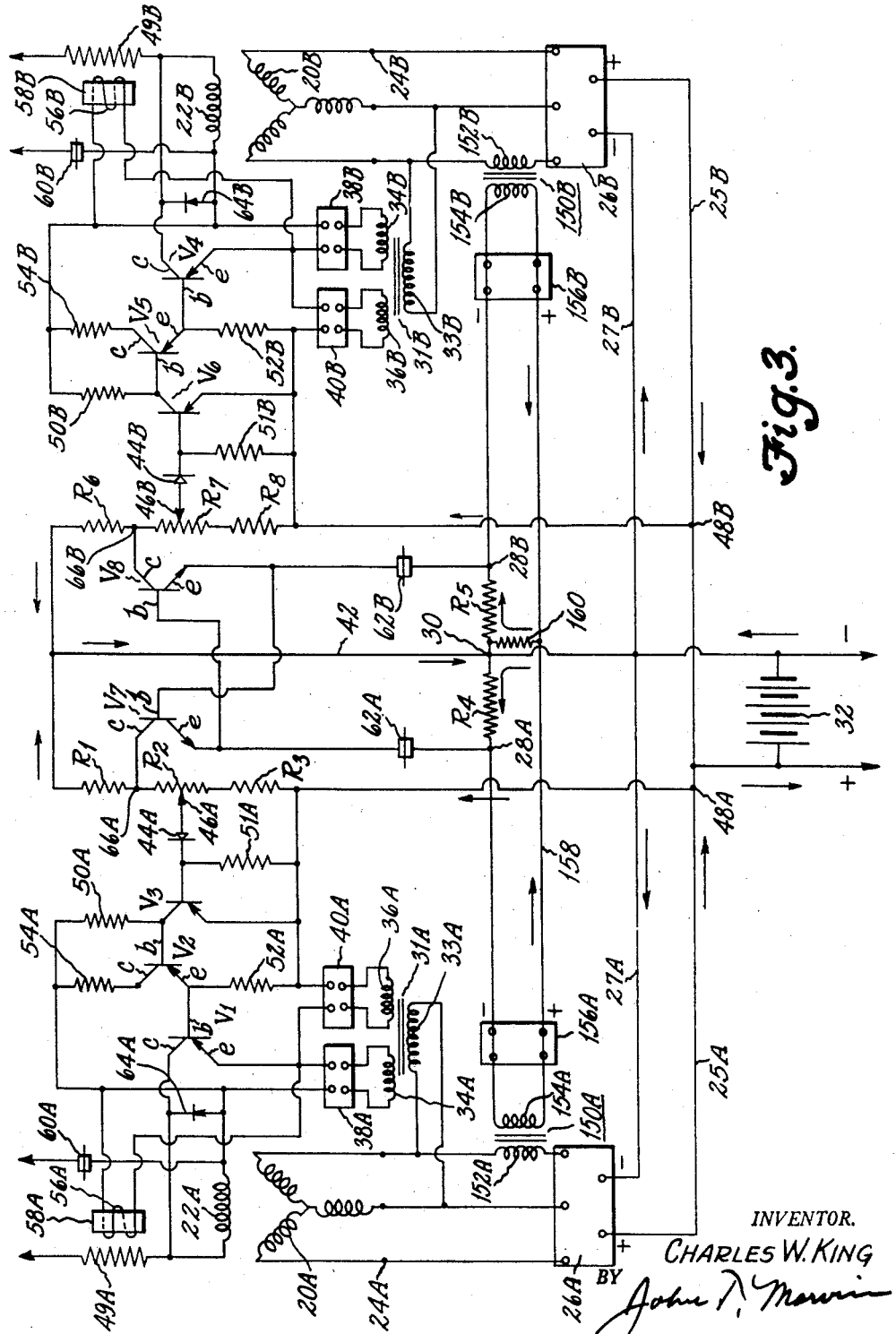
Figure 3 shows a modification of the circuit in Fig. 1.

In Figure 3 of the drawings a modification of the paralleling circuit in Figure 1 is shown. In this modification like circuits and components therein will be given the same numerical designation as described for the embodiment in Figure 1.

In this embodiment the transformers 150A and 150B have their primary coil windings 152A and 152B connected as shown in series between the respective output terminals 24 of the alternators 20 and the input terminals of the power rectifiers 26. These windings 152A and 152B when thus connected will be responsive to the loads on the respective alternators 20.

The secondary windings 154A and 154B of transformers 150 are connected to the input terminals of rectifiers 156A and 156B respectively. The positive output terminals of the rectifiers 156 are connected together by a lead 158. The negative output terminal of rectifier 156A is connected through a junction 28A and a resistance $R_4$ to a junction 30. The negative output terminal of rectifier 156B is connected through a junction 28B and a resistance $R_5$ to junction 30. The resistance 160 is connected to the negative lead between resistances $R_4$ and $R_5$ and to the lead 160. When the circuits are thus connected the output of rectifier 156A flows from the positive output terminal through resistance $R_5$ and $R_4$ to the negative terminal of the rectifier 156A. At the same time the output current of rectifier 156B will flow through resistance $R_4$ and resistance $R_5$ to the input terminal of the rectifier 156B.

Assuming the regulator on the left of the drawing is adjusted to operate at a higher voltage than the regulator on the right, then the current in the windings of transformer 150A will be greater than the current in the windings of transformer 150B.

When the current in winding 154A is greater than the current in 154B the output current of rectifier 156A will be greater than 156B. Consequently, the current through resistance $R_4$ will be greater than the current through resistance $R_5$. This will cause junction 28A to be negative with respect to junction 28B. When junction 28A is negative with respect to junction 28B the output of the alternator 20A will be reduced as has been previously described.

While the embodiments of the present invention as herein disclosed, constitutes preferred forms, it is to be understood that other forms might be adopted.

What is claimed is as follows:

1. A circuit network for equalizing the output voltages of a pair of variable speed alternators, each having an energizing field and each connected for parallel operation to a direct current circuit through a rectifier, comprising; a voltage regulator means for each alternator including a voltage sensitive diode connected in circuit with the rectifier and field of the alternator which the regulator is to control, and means including a transistor connected in circuit with said diode and the rectifiers of both alternators for increasing and decreasing the voltage drop across said diode in response to a predetermined output difference of said alternators.

2. A circuit network for use with a pair of alternators each having an energizing field and each connected for parallel operation to a direct current circuit through a rectifier, comprising; a voltage regulator means connected in circuit with the rectifier and field of the alternator which the regulator is to control, said regulator means including a voltage divider connected across the direct current output terminals of said rectifier, a voltage sensitive diode connected to said divider and conductive when the drop in voltage across a portion of said divider exceeds a predetermined value, and means in circuit with the rectifiers for varying the voltage drop across said divider in response to a predetermined difference in outputs of said alternators.

3. In a circuit network, the combination comprising; a pair of alternators each having output terminals and an exciting field, a rectifier for each alternator connected to the output terminals thereof to supply direct current to a common direct current circuit, a voltage regulator for each alternator calibrated to vary the excitation of the field thereof for maintaining the output voltage of said alternator at a predetermined substantially constant value, and means including a transistor connected in circuit with the voltage regulator means of one of the alternators and with the rectifiers of both alternators for causing the regulator to decrease the excitation of the field of said one alternator when the output of said one alternator exceeds the output of the other alternator.

4. In a circuit network, the combination comprising; a pair of alternators, each having output terminals and an exciting field, a rectifier for each alternator connected to the output terminals thereof to supply direct current to a common direct current circuit, a voltage regulator for each alternator calibrated to vary the excitation of the field thereof for maintaining the output voltage of said alternator at a predetermined substantially constant value, and means including a transistor for each regulator means connected to both rectifiers for changing the effect of the calibration of at least one of said regulating means on said field whenever a predetermined output difference exists between said alternators.

5. In a circuit network, the combination comprising; a pair of alternators, each having output terminals and an exciting field winding; a rectifier for each alternator connected to the output terminals of the alternator associated therewith and to a common direct current circuit, a voltage regulator for each alternator connected in circuit with the field and arranged to vary the energization of the field of the alternator associated therewith to maintain the output voltage of the alternator at a substantially constant value, said voltage regulator including; a voltage divider connected in circuit with both of said rectifiers and a diode sensitive to the voltage drop across said voltage divider, and means connected with both rectifiers for varying the voltage drop across at least one of said voltage dividers whenever the output of said alternators differs by a predetermined amount.

6. In a circuit network, the combination comprising; a pair of alternators, each having output terminals and an exciting field winding; a rectifier for each alternator connected to the output terminals of the alternator associated therewith and to a common direct current circuit, a voltage regulator for each alternator connected in circuit with the field and arranged to vary the energization of the field of the alternator associated therewith to maintain the output voltage of the alternator at a substantially constant value, said voltage regulator including; a voltage divider connected in circuit with both of said rectifiers, means including a diode that is sensitive to the voltage drop across said voltage divider, and means connected with both rectifiers for varying the effect of said divider on said diode whenever the outputs of said alternators differ by a predetermined amount.

7. In a circuit network, the combination comprising; a pair of alternators, each having output terminals and an exciting field winding; a rectifier for each alternator connected to the output terminals of the alternator associated therewith and to a common direct current circuit, a voltage regulator for each alternator connected in circuit with the field and arranged to vary the energization of the field of the alternator associated therewith to maintain the output voltage of the alternator at a substantially constant value, said voltage regulator including; a voltage divider connected in circuit with both of said rectifiers, means including a diode that is sensitive to the voltage drop across said voltage divider, and means connected 2,859,356

7 with both rectifiers for varying the effect of said divider on said diode whenever the outputs of said alternators differ by a predetermined amount, said means including; a pair of resistance elements connected in series in said common D. C. circuit and a transistor for each of said voltage dividers connected across said resistances for varying the voltage drop across at least one of said dividers whenever the output of one of said alternators differs by a predetermined amount from the output of the other.

8. In a circuit network, the combination comprising; a pair of alternators each having output terminals and an exciting field winding; a rectifier for each alternator connected to the output terminals thereof and to a common direct current circuit, a voltage regulator for each alternator connected in circuit with and arranged to vary the excitation of the field of the alternator associated therewith to maintain the output voltage of the alternator substantially at a predetermined constant value, said voltage regulator including; a voltage divider and means sensitive to a voltage drop across a portion of said divider, and a means connected with both rectifiers for varying the voltage drop across said portion of the voltage divider whenever the output of the alternator associated with said divider is different by a predetermined amount from the output of the other alternator.

9. A circuit network for equalizing the output voltages of a pair of variable speed alternators, each having an energizing field and each connected for parallel operation to a direct current circuit through a rectifier, comprising; a voltage regulator means for each alternator including a voltage sensitive diode connected in circuit with the rectifier and field of the alternator which the regulator is to control, and means including a transistor connected in circuit with said diode of each alternator and with said rectifiers for increasing and decreasing the voltage drop across said diode in response to a predetermined output difference of said alternators.

10. A circuit network for use with a pair of alternators each having an energizing field and each connected for parallel operation to a direct current circuit through a rectifier, comprising; a voltage regulator means connected in circuit with the rectifier and field of the alternator which the regulator is to control, said regulator means including a voltage divider connected across the direct current output terminals of said rectifier, a voltage sensitive diode connected to said divider and conductive when the drop in voltage across a portion of said divider exceeds a predetermined value, and means in circuit with the output circuit of each alternator for varying the voltage drop across said divider in response to a predetermined difference in outputs of said alternators.

11. In a circuit network for controlling a pair of alternators which are each connected through a rectifier to a common D. C. line, the combination comprising; a separate exciting field for each alternator, a source of D. C. voltage connected with each field, a voltage regulator in circuit with the field of each alternator and in circuit with said source of D. C. voltage for controlling the excitation of the field for maintaining the output voltage of the alternator at a predetermined value, and means including a rectifier and a transistor connected in circuit with the voltage regulators of both alternators for changing the control of at least one of said regulators on said field whenever the outputs of said alternators are unequal by a predetermined amount.

12. In a circuit network, the combination comprising; a pair of alternators each having output terminals and an exciting field, a rectifier for each alternator connected to the output terminals thereof to supply direct current to a common direct current circuit, a source of D. C. exciting voltage connected with each field, a voltage regulator for each alternator in circuit with each field and in circuit with said source of D. C. exciting voltage calibrated to vary the excitation of the field thereof for maintaining

8 the output voltage of said alternator at a predetermined substantially constant value, and means including a transistor connected in circuit with the voltage regulator means of one of the alternators and with a second rectifier for each alternator for causing the regulator to decrease the excitation of the field of said one alternator when the output of said one alternator exceeds the output of the other alternator.

13. In a circuit network, the combination comprising; a pair of alternators, each having output terminals and an exciting field winding; a rectifier for each alternator connected to the output terminals of the alternator associated therewith and to a common direct current circuit, a voltage regulator for each alternator connected in circuit with the field and arranged to vary the energization of the field of the alternator associated therewith to maintain the output voltage of the alternator at a substantially constant value, said voltage regulator including; a voltage divider connected in circuit with both of said rectifiers and a diode sensitive to the voltage drop across said voltage divider, and means including a second rectifier for each alternator arranged to vary the voltage drop across at least one of said voltage dividers whenever the output of said alternators differs by a predetermined amount.

14. In a circuit network, the combination comprising: a pair of alternators, each having output terminals and an exciting field winding; a rectifier for each alternator connected to the output terminals of the alternator associated therewith and to a common direct current circuit, a voltage regulator for each alternator connected in circuit with the field and arranged to vary the energization of the field of the alternator associated therewith to maintain the output voltage of the alternator at a substantially constant value, said voltage regulator including; a voltage divider connected in circuit with both of said rectifiers, means including a diode that is sensitive to the voltage drop across said voltage divider, and means connected with both alternators for varying the effect of said divider on said diode whenever the outputs of said alternators differ by a predetermined amount, said means including; a pair of transformers having secondaries connected with a pair of second rectifiers and having primaries connected so as to be responsive to alternator output current, a pair of resistance elements connected in series in said second rectifiers and a transistor for each of said voltage dividers connected across said resistances for varying the voltage drop across at least one of said dividers whenever the output of one of said alternators differs by a predetermined amount from the output of the other.

15. In a circuit network, the combination comprising; a pair of alternators each having output terminals and an exciting field winding; a rectifier for each alternator connected to the output terminals thereof and to a common direct current circuit, a voltage regulator for each alternator connected in circuit with and arranged to vary the excitation of the field of the alternator associated therewith to maintain the output voltage of the alternator substantially at a predetermined constant value, said voltage divider including; a voltage divider and means sensitive to a voltage drop across a portion of said divider, and a means connected with both alternators for varying the voltage drop across said portion of the voltage divider whenever the output of the alternator associated with said divider is different by a predetermined amount from the output of the other alternator.

References Cited in the file of this patent
UNITED STATES PATENTS 2,751,550    Chase _____ June 19, 1956

FOREIGN PATENTS 653,994    Great Britain _____ May 30, 1951